United States Patent
Shah et al.

(10) Patent No.: US 6,262,506 B1
(45) Date of Patent: Jul. 17, 2001

(54) STATOR FOR A ROTATING ELECTRICAL MACHINE HAVING MULTIPLE CONTROL WINDINGS

(75) Inventors: Manoj R. Shah, Latham; Chad R. Lewandowski, Amsterdam, both of NY (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 09/305,377

(22) Filed: May 5, 1999

(51) Int. Cl.$^7$ .................................................... H02K 7/09
(52) U.S. Cl. ...................... 310/90.5; 310/179; 310/180; 310/184; 318/254; 318/288
(58) Field of Search .................................. 310/90.5, 179, 310/184, 185, 191, 194, 216; 318/254, 288, 138, 135

(56) References Cited

U.S. PATENT DOCUMENTS

| | | | | |
|---|---|---|---|---|
| 3,888,553 | * | 6/1975 | Wehde | 308/10 |
| 4,286,180 | * | 8/1981 | Langley | 310/12 |
| 4,434,389 | * | 2/1984 | Langley et al. | 318/254 |
| 4,630,013 | * | 12/1986 | Takada | 334/12 |

\* cited by examiner

*Primary Examiner*—Elvin Enad
*Assistant Examiner*—Thanh Lam
(74) *Attorney, Agent, or Firm*—John T. Lucas; Virginia B. Caress; Paul A. Gottlieb

(57) ABSTRACT

A rotating electric machine is provided which includes multiple independent control windings for compensating for rotor imbalances and for levitating/centering the rotor. The multiple independent control windings are placed at different axial locations along the rotor to oppose forces created by imbalances at different axial locations along the rotor. The multiple control windings can also be used to levitate/center the rotor with a relatively small magnetic field per unit area since the rotor and/or the main power winding provides the bias field.

14 Claims, 2 Drawing Sheets

US 6,262,506 B1

STATOR FOR A ROTATING ELECTRICAL MACHINE HAVING MULTIPLE CONTROL WINDINGS

BACKGROUND OF THE INVENTION

1. Field of the Invention

The present invention relates to rotating electrical machines having auxiliary windings in the stator of the machines for providing multiplanar rotor balancing, mechanical stiffening and rotor levitation/centering independent of machine orientation or axis of rotation.

2. Related Art

Electrical machines, such as motors and generators, may use auxiliary or control windings for rotor levitation/centering and rotor balancing. A typical rotor can have a slight amount of mass imbalance. As the rotor rotates, the mass imbalance leads to an unwanted vibrational force appearing at the motors bearings. Such vibrational forces reduce the lifetime of bearings and degrade the performance of the machine. The electromagnetics associated with the machine can also cause undesired forces which appear at the motor casing due to deflection of the stator core. Prior attempts have been made to cancel the forces created by a mass imbalance and/or electromagnetics by forming a magnetic field with auxiliary control windings in a manner which creates a force on the rotor to cancel the undesired forces.

In conventional electrical machines which incorporate auxiliary windings, the control windings are provided along the entire active length of the machine which provides a uniform force distribution. A single sensor measures the effect of undesired forces at a single point and feeds the information to a controller. The controller then drives the control windings with a controlled voltage or current determined from the measurements made by the sensor. With this winding arrangement, optimizing the performance at one axial location along the rotor based on sensor measurements may make the performance at other locations worse.

Some prior art machines also include radial magnetic bearings. Magnetic bearings cause the rotor to levitate/center and eliminate the need for mechanical contacts. Conventional magnetic bearings are placed only on the spindle, which has a relatively smaller diameter. Such placement necessitates the use of a high magnetic field per unit area or use of axially longer bearing surface (since the magnetic field may be limited by material characteristics) in order to levitate/center the rotor.

SUMMARY OF THE INVENTION

According to the invention, there is provided an electrical machine with multiple independent control windings placed at different axial locations along the stator independent of rotor type. The control windings optimize the performance of the machine by canceling undesired forces produced by 1) mass imbalances of the rotor, 2) variations in rotor position or 3) electromagnetics, and, in one embodiment, also act as magnetic bearings to provide a bearingless, globally balanced machine.

In accordance with a first embodiment of the invention, a rotating electrical machine is provided which comprises: a stator; a rotor adapted for rotation relative to the stator and having a longitudinal axis; a first set of control windings mounted on the stator for producing a magnetic field to oppose an undesired force at a first location along the longitudinal axis of the rotor, and a second set of control windings mounted on the stator for producing a magnetic field to oppose an undesired force at a second location (which may overlap the first location) along the longitudinal axis of the rotor spaced from the first location.

The first set of control windings preferably has a different distribution than the second set of control windings. It is also preferred that the first set of control windings has an axial length different from that of the axial length of the second set of control windings.

In a preferred embodiment, the first and the second sets of control windings produce magnetic fields for levitating, balancing or centering the rotor.

In another preferred embodiment, the machine further includes a third set of control windings mounted on the stator for producing a magnetic field to oppose other undesired forces at a third location along the longitudinal axis of the rotor spaced from the first location and the second location.

In a first preferred implementation of the first preferred embodiment, the machine also includes: a first set of lead wires connected to the first set of control windings at an edge of the stator; a second set of lead wires connected to the second set of control windings at an edge of the stator; and a third set of lead wires connected to the third set of control windings and placed between or alongside the first set of control windings and arranged to exit at an edge of the stator.

In a second preferred implementation of the first preferred embodiment, the machine includes: a first set of lead wires connected to the first set of control windings at an edge of the stators a second set of lead wires connected to the second set of control windings at an edge of the stator; and a third set of lead wires connected to the third set of control windings and arranged to exit radially through a hole in the stator.

In another preferred embodiment, the machine further includes a means for providing axial spacings of the first set of control winding end turns and the second set of control winding end turns. In a first preferred implementation of this embodiment, the means for providing axial spacing comprises beams mounted on at least one side of a stator lamination and having regions between the beams for mounting the first set of control winding end turns and the second set of control winding end turns. In a second preferred implementation of this embodiment, the means for providing axial spacing comprises toothless laminations having recessed regions for mounting said first set of control winding end turns and said second set of control winding end turns therein. In a third preferred implementation of this embodiment, the means for providing axial spacing comprises stepped laminations having recessed regions for mounting said first set of control winding end turns and said second set of control winding end turns therein.

In accordance with a second preferred embodiment of the invention, a rotating electrical machine is provided which comprises: a stator; a rotor adapted for rotation relative to the stator; a first set of control windings attached to the stator for producing a first magnetic field to apply a force to the rotor at a first axial location of the rotor; a second set of control windings attached to the stator and overlapping and extending beyond the first set of control windings for producing a second magnetic field for opposing undesired forces at a second axial location of the rotor and for, in combination with the first magnetic field, opposing undesired forces at the first axial location of the rotor.

The machine preferably includes a third set of control windings attached to the stator and overlapping and extending beyond the first and the second sets of control windings for producing a third magnetic field for opposing undesired forces at a third axial location of the rotor and for, in combination with the first and the second magnetic field, opposing undesired forces at the first axial location of the rotor and for, in combination with the second magnetic field, opposing undesired forces at the second axial location of the rotor.

Other features and advantages of the invention will be set forth in, or apparent from, the following detailed description of the preferred embodiments of the invention.

DESCRIPTION OF THE PREFERRED EMBODIMENTS

Figure 1:
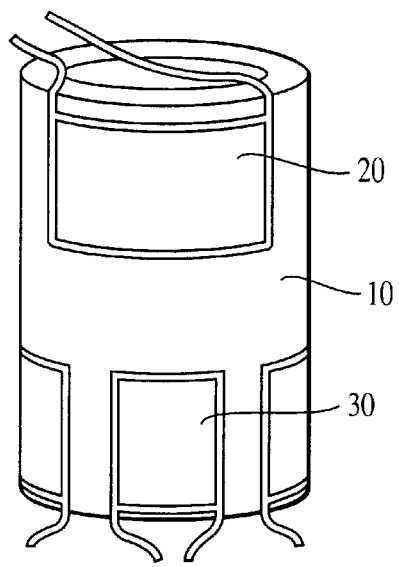
FIG. 1 is a schematic representation of a stator assembly having multiple control windings in accordance with a first preferred embodiment of the invention.

Referring to FIG. 1, there is shown the stator assembly of an electrical machine having multiple control windings 20 and 30 located at different axial zones along the stator 10 in accordance with a first preferred embodiment of the invention. As illustrated, control windings 20 are located in a first axial zone and control windings 30 are located in a second, spaced axial zone. The distribution of the windings associated with each axial zone are optimized for the degree of rotor balancing and levitation/centering required at the given axial zones. The variables of the distribution include: the number of poles, number of turns, number of phases, mechanical displacement, and full or partial peripheral occupancy in each axial zone. Each winding can be controlled at any frequency and at a magnitude and phase angle independent of the other windings.

Multiple control windings allow the rotor to be more precisely balanced, when compared to a single set of control windings. Control windings 20 can be used to cancel any mass imbalance and other undesired effects found in the first axial zone. Similarly, control windings 30 can be driven independently of control windings 20 to cancel any mass imbalance and other undesired effects found in the second axial zone. The use of multiple control windings allows the rotor to be balanced in one axial zone independent of another axial zone.

In addition to rotor balancing, the control windings 20 and 30 can function as magnetic bearings to perform rotor levitation/centering or mechanical stiffening in their respective axial zones. Conventional magnetic bearings apply the magnetic field at the spindle, which has a relatively small diameter. Applying the magnetic field over the larger diameter of the main rotor body makes for a more robust system. Also, magnetic bearings must supply both the bias and control fields while the auxiliary windings only need to supply the control field, since the bias field is already provided by the rotor and/or the main power winding. The use of multiple windings as magnetic bearings also allows the desired forces to be optimized for each axial zone, which results in improved rotor dynamic performance. The elimination of conventional magnetic bearings also improves the dynamic performance of the rotor by shortening the overall shaft or bearing span.

Figures 2A, 2B, 2C:
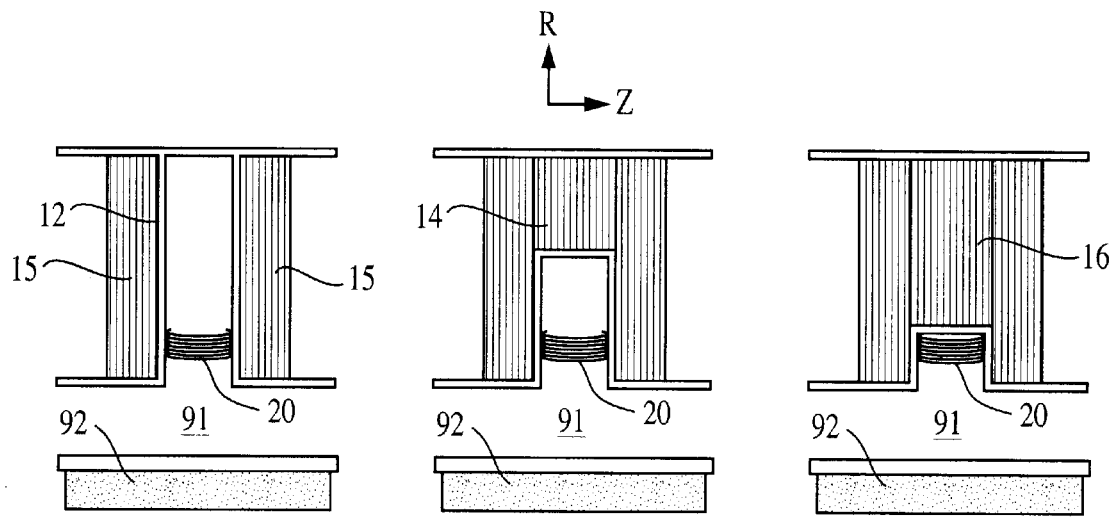
FIG. 2A is a schematic representation of an electrical machine having a stator constructed in accordance with a first implementation of the first preferred embodiment of the invention.
FIG. 2B is a schematic representation of an electrical machine having a stator constructed in accordance with a second implementation of the first preferred embodiment of the invention.
FIG. 2C is a schematic representation of an electrical machine having a stator constructed in accordance with a third implementation of the first preferred embodiment of the invention.

While only two sets of windings are shown for illustration purposes, it is understood that several more sets of windings can be provided in a similar manner. The axial spacing between adjacent zones is dictated by the size of the windings. Several different constructions can be used to maintain accurate spacing between the axial zones while providing enough room for the end turns of the control windings. In a first implementation, shown schematically in FIG. 2A, "I", shaped, rectangular or other shaped beams indicated at 12, are used in the stator and are placed on one or both sides of a lamination 15 as to support the rest of the stator core through compression during final assembly. The control windings 20 are located between the stator laminations 15 and across an air gap 91 from the rotor which is indicated at 92. In a second implementation, shown schematically in FIG. 2B, "toothless" laminations 14 are used for the stator material. Toothless laminations 14 aid the stator yoke magnetic circuit and provide mechanical support to the stator. In a third implementation, shown schematically in FIG. 2C, stepped or shortened tooth laminations 16 are used for the stator material to minimize adverse electromagnetic effects caused by the removal of magnetic material and to maximize mechanical support. The end turns of the control windings 20 are preferably held in place so that they do not drop into the air gap 91. In one preferred embodiment, the end turns are radially wedged under axial wedges (not shown) and tied, if necessary, to the axial wedges.

Figure 3:
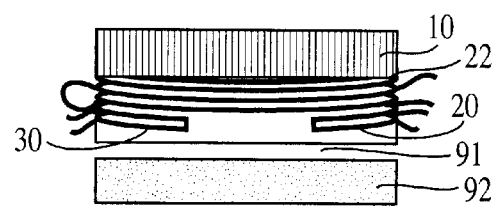
FIG. 3 is a cross-sectional view of an electrical machine in accordance with the first preferred embodiment of the invention

Referring to FIG. 3, there is shown a cross-sectional view of an electrical machine in accordance with the first preferred embodiment of the invention. Conventional main power windings 22 are mounted on the stator 10. As indicated above, an air gap 91 separates the rotor 92 from the control windings 20 and 30. The control windings 20 and 30 are preferably mounted on stator 10 at a radial location between the air gap 91 and the main power windings 22 to minimize the leakage reactance and power requirements of the control windings 20 and 30. Alternatively, the main power winding may be located between the air gap and the control windings, if other design considerations dictate this layout.

Figure 4A:
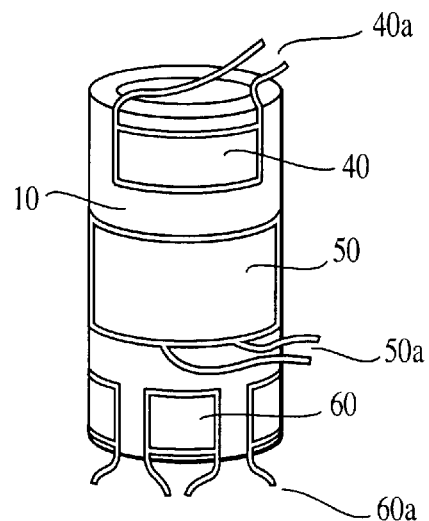
FIG. 4A is a schematic representation of a manner of connecting lead wires to the control windings according to a first implementation of the first preferred embodiment of the invention.
Figure 4B:
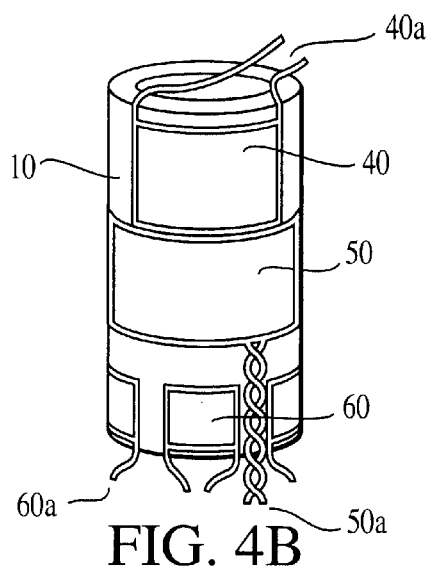
FIG. 4B is a schematic representation of a manner of connecting lead wires to the control windings according to a second implementation of the first preferred embodiment of the invention.

A first preferred implementation for connecting lead wires to a winding arrangement comprising three separate axially spaced control windings 40, 50 and 60 is shown in FIG. 4A. Windings 40 and 60 which are formed at the edge of the stator 10 have respective lead wires 40a and 60a attached or connected thereto at the edge of the stator. Control windings 50 are formed at an axial zone located in the middle of the stator 10 and associated lead wires 50*a* are inserted through the frame (not shown) and the stator 10 and are connected to the control windings 50. FIG. 4B illustrates a second preferred implementation for connecting lead wires to control windings 40, 50 and 60. In this embodiment, the lead wires 40*a* and 60*a* connected to control windings 40 and 60 are connected in the same manner as shown in FIG. 4A but the lead wires 50*a* connected to control windings 50 are twisted and placed between or alongside the control windings 60 and arranged so as to exit at the edge of the stator. Unlike the implementation shown in FIG. 4A, there is no need to place a hole in the frame (not shown) and the stator 10.

Figure 5:
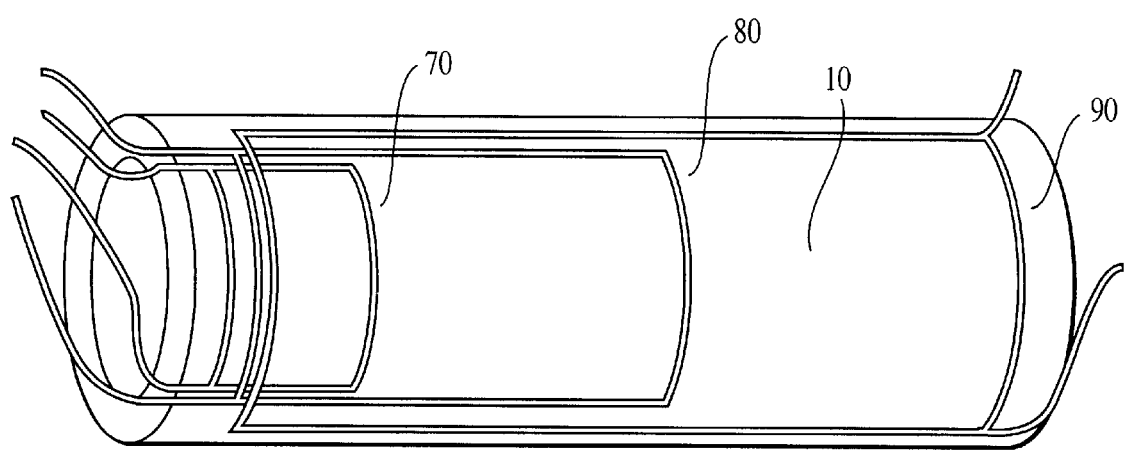
FIG. 5 is a schematic representation of a stator having multiple control windings in accordance with a second preferred embodiment of the invention.

FIG. 5 illustrates a second preferred embodiment of the invention. In this embodiment, separate control windings 70, 80 and 90 are provided which overlap each other and span different axial lengths. This arrangement of the three sets of control windings 70, 80 and 90 creates three separate axial zones. The first axial zone is located where control windings 70, 80 and 90 overlap, the second axial zone is located where only control windings 80 and 90 overlap and the third axial zone is located where control windings 90 do not overlap the other control windings. Each of the control windings 70, 80 and 90 are separately controlled to produce independent magnetic fields. The magnetic fields produced by the control windings can aid or oppose the magnetic fields produced by the other control windings. The magnetic fields produced by the control windings can be used for rotor balancing and/or rotor levitation/centering in a manner similar to that of the first embodiment of the invention.

Although the invention has been described in detail with respect to preferred embodiments thereof, it will be apparent to those skilled in the art that variations and modifications can be effected in these embodiments without departing from the spirit and scope of the invention.

We claim:

1. A rotating machine comprising:

a stator;

a rotor adapted for rotation relative to said stator;

a first set of control windings mounted on said stators wherein said first set of control windings produces a magnetic field opposing undesired forces acting on said rotor at a first location on said rotor; and a second set of control windings mounted on said stator, wherein said second set of control windings produces a magnetic field opposing undesired forces acting on said rotor at a second location on said rotor.

2. A machine as claimed in claim 1 wherein said first set of control windings comprises a first number of windings and said second set of control windings comprises a second number of windings identical to said first number of windings.

3. A machine as claimed in claim 1 wherein said first set of control windings and said second set of control windings are the same size in at least one spacial dimension.

4. A machine as claimed in claim 1 wherein said first and said second sets of control windings produce magnetic fields for levitating/centering said rotor.

5. A machine as claimed in claim 1, further comprising:

a third set of control windings mounted on said stators, wherein said third set of control windings produces a magnetic field opposing undesired forces acting on said rotor at a third location on said rotor.

6. A machine as claimed in claim 1, further comprises a spacer between said first set of control windings and said second set of control windings.

7. A machine as claimed in claim 6, wherein said spacer comprises beams mounted on at least one side of a stator lamination and having regions between said beams for mounting said first set of control windings and said second set of control windings.

8. A machine as claimed in claim 6, wherein said spacer comprises toothless laminations adapted for mounting said first set of control windings and said second set of control windings therein.

9. A machine as claimed in claim 6, wherein said spacer comprises stepped laminations adapted for mounting said first set of control windings and said second set of control windings therein.

10. A rotating electrical machine comprising:

a stator;

a rotor adapted for rotation relative to said stator;

a first set of control windings attached to said stators, wherein said first set of control windings produces a first magnetic field to apply a force to said rotor at a first location of said rotor;

a second set of control windings attached to said stator and overlapping and extending beyond said first set of control windings, wherein said second set of control windings produces a second magnetic field opposing undesired forces at a second location of said rotor and in combination with said first magnetic field, opposing undesired forces at said first location of said rotor.

11. A machine as claimed in claim 10 wherein said first set of control windings comprises a first number of windings and said second set of control windings comprises a second number of windings identical to said first number of windings.

12. A machine as claimed in claim 10 wherein said first set of control windings and said second set of control windings are the same size in at least one spacial dimension.

13. A machine as claimed in claim 10 wherein said first and said second sets of control windings produce magnetic fields for levitation/centering said rotor.

14. A machine as claimed in claim 10, further comprising:

a third set of control windings attached to said stator and overlapping and extending beyond said first and said second sets of control windings, wherein said third set of control windings produces a third magnetic field opposing undesired forces acting on said rotor at a third location of said rotor and, in combination with said first and said second magnetic fields, opposing undesired forces acting on said rotor at said first location of said rotor and, in combination with said second magnetic field, opposing undesired forces acting on said rotor at said second location of said rotor.

* * * * *